(12) United States Patent
Koyanagi et al.

(10) Patent No.: US 6,606,688 B1
(45) Date of Patent: Aug. 12, 2003

(54) CACHE CONTROL METHOD AND CACHE CONTROLLER

(75) Inventors: Masaru Koyanagi, Hadanu (JP); Disuke Yamane, Hadano (JP); Hideya Akashi, Kunitachi (JP); Yuji Tsushima, Kokubunji (JP); Tadayuki Sakakibara, Atsugi (JP)

(73) Assignee: Hitachi, Ltd., Tokyo (JP)

( * ) Notice: Subject to any disclaimer, the term of this patent is extended or adjusted under 35 U.S.C. 154(b) by 248 days.

(21) Appl. No.: 09/642,002

(22) Filed: Aug. 21, 2000

(30) Foreign Application Priority Data

Aug. 24, 1999 (JP) ............................ 11-236443

(51) Int. Cl.$^7$ ............................ G06F 12/00
(52) U.S. Cl. ............ 711/137; 711/117; 711/122; 711/220
(58) Field of Search ............... 711/137, 136, 711/117, 118, 122, 220

(56) References Cited

U.S. PATENT DOCUMENTS

| | | | | |
|---|---|---|---|---|
| 4,980,823 A | * | 12/1990 | Liu ............................ | 711/136 |
| 5,499,355 A | * | 3/1996 | Krishnamohan et al. .... | 711/118 |
| 5,537,573 A | * | 7/1996 | Ware et al. .................. | 711/137 |
| 5,778,422 A | * | 7/1998 | Genduso et al. ............ | 711/117 |
| 5,778,436 A | * | 7/1998 | Kedem et al. ............... | 711/122 |

FOREIGN PATENT DOCUMENTS

JP    62-192831    8/1987

OTHER PUBLICATIONS

Bianchini et al., "A Preliminary Evaluation of Cache-—Miss–Initiated Prefetching Techniques in Scalable Mulit-processors", © May 1994, p. 1–25.*
Handy, "The Cache Memory Book", 2nd ed., © 1998, Academic Press Inc., p. 65.*
Dundas et al., "Improving Data Cache Performance by Pre–executing Instructions Under a Cache Miss", © 1997 ACM, p. 68–75.*
Fu et al., "Stride Directed Prefetching in Scalar Processors", © 1992 IEEE, p. 102–110.*

\* cited by examiner

Primary Examiner—Do Hyun Yoo
Assistant Examiner—Brian R. Peugh
(74) Attorney, Agent, or Firm—Mattingly, Stanger & Malur, P.C.

(57) ABSTRACT

A cache controller stores pre-set variables for pre-fetch block size and stride value. A cache controller receives an access request for the main memory from the processor, and generates a pre-fetch request based an the access request and the variables. The cache controller reads data from main memory based on the generated pre-fetch request and writes this data to the cache memory.

17 Claims, 7 Drawing Sheets

CACHE CONTROL METHOD AND CACHE CONTROLLER

BACKGROUND OF THE INVENTION

1. Field of the Invention

The present invention relates to a computer system equipped with a cache memory interposed between a processor and a main memory. More specifically, the present invention relates to a computer system that uses access requests from the processor to the main memory and variables set up beforehand to automatically generate and issue pre-fetch requests.

2. Description of Related Technology

In computer systems equipped with a cache to offset performance differences between a processor and main memory, latency from data reads are reduced by using a pre-fetch request before a data read request is received from the processor, thus allowing data that may be used in the future to be read into cache memory from the main memory beforehand. For example, in Japanese laid-open patent publication number 62-192831, a processor issues a pre-fetch request at the same time that it issues a memory access request. On the cache memory side, the pre-fetch request is received and, if the memory access request misses the cache, the requested block and the next block are loaded from main memory into the cache memory.

SUMMARY OF THE INVENTION

Figure 4:
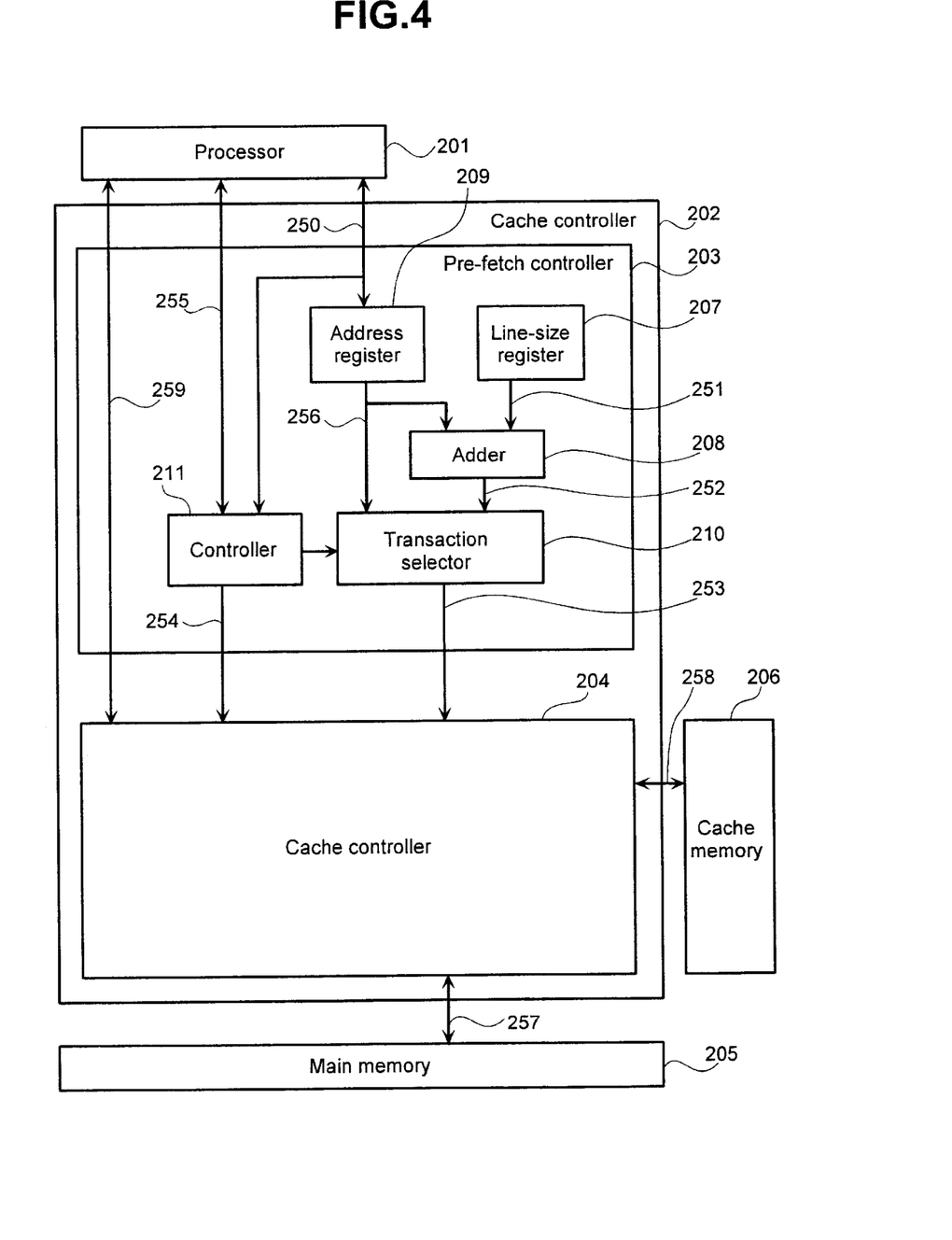
FIG. 4 is a schematic drawing of the architecture of a computer system equipped with a cache controller.

FIG. 4 shows a schematic block diagram of a computer system equipped with a cache controller. FIG. 4 shows a processor 201, a cache controller 202, a main memory 205, and a cache memory 206. The cache controller 202 includes a pre-fetch controller 203 that generates pre-fetch requests and a cache controller 204 that reads data from the cache memory 206 and the main memory 205.

The pre-fetch controller 203 includes: an address register that latches an address output from the processor 201 via a path 250; a line size register 207 that stores the line width (block width) of the cache: an adder 208 that adds the address received from the address register 209 via a path 256 and a line size received from the line-size register 207 via a path 251; a transaction selector 210 that uses a select signal received via a path 257 to select between addresses received from the path 256 and the path 252, and that issues the selected address to the processor 201 via the path 250; and a controller 211 that receives access requests from the processor 201 via the path 250 and that generates a select signal for the transaction selector 210.

The following is a description of the operations performed by the cache controller 202. The processor 201 issues a data read request and a pre-fetch request to the cache controller 202 via the path 250. In the pre-fetch controller 203 of the cache controller 202, the controller 211 receives the requests from the processor 201, and the address is set up in the address register 209. The controller 211 first generates a select signal via the path 257 so that the address from the address register 209 is selected as the output from the transaction selector 210. The transaction selector 210 selects the data read address from the address register 209 and sends this to the cache controller 204 via the path 253. At the same time, the controller 211 issues a data read request to the cache controller 204 via the path 254. The cache controller 204 determines if the data corresponding to the read request is already stored in the cache memory 206. If it is, the data is read from the cache memory 206 via the path 258 and is then sent to the processor 201 via the path 259. The cache controller 204 then notifies the controller 211 via the path 254 that the data read is completed, and the operation is terminated.

If the data corresponding to the read request is not stored in the cache memory 206, the cache controller 204 reads data from the main memory 205 via the path 257 and writes this data to the cache memory 206 via the path 258. At the same time, this read data from the main memory 205 is sent to the processor 201 via the path 259. The cache controller 204 then notifies the controller 211 via the path 254 that the data read operation has been completed. The controller 211 performs data communication control with the processor 201 via the path 255. At this point, the controller 211 sends a select signal to the transaction selector 210 via the path 257 so that the next pre-fetch address is selected. The transaction selector 210 selects the address (pre-fetch address) from the adder 208 and outputs this to the cache controller 204 via the path 253. At the same time, the controller 211 issues a request to read pre-fetch data from the main memory 205 to the cache controller 204 via the path 254. The cache controller 204 reads, via the path 257, the next data after the data corresponding to the previous read request from the main memory 257. This data is written to the cache memory 206 via the path 258. When this is completed, the cache controller 204 notifies the controller 211 that the data read operation has been completed. The controller 211 notifies the processor 201 via the path 255 that the pre-fetch operation has been completed. In the conventional technology described above, if there is a pre-fetch request from the processor, the data read into the cache memory includes only two lines of data, assuming a cache miss: the data requested by the processor and the subsequent data. Pre-fetching data other than these two lines of data would require the processor to frequently issue repeated pre-fetch requests.

Furthermore, if the processor is not equipped with the feature for issuing pre-fetch requests, pre-fetches are not generated since the cache controller itself does not generate pre-fetch requests. This prevents effective use of the cache memory. Also, even if the data requested by the processor generates a cache hit, the next data will not necessarily generate a cache hit. However, in the conventional technology described above, if data requested from the processor generates a cache hit, the pre-fetch request from the processor is ignored. This also prevents effective use of the cache memory.

The object of the present invention is to overcome the problems of the conventional technology described above and to allow cache memory to be used effectively in the following manner; when a read access request for main memory is issued by a processor, a cache controller generates at least one pre-fetch request with a variable stride width or with an address that is higher or lower than the requested address. This allows more data to be written to the cache memory, thus allowing effective use of the cache memory.

In the present invention, a cache controller includes: means for storing variables, including a pre-fetch block size and a stride value; means for generating at least one pre-fetch request based on an access request for the main memory from the processor and the variables; and means for reading data from the main memory based on the generated pre-fetch request and writing the data to the cache memory.

Also, the cache controller generates pre-fetch requests with addresses that are either higher or lower than the address of the main memory access request. To eliminate excess requests for the main memory, the cache controller suppresses pre-fetch requests if a cache hit is generated by the generated pre-fetch request.

DESCRIPTION OF PREFERRED EMBODIMENTS

The following is a detailed description of the preferred embodiments of the present invention, with references to the drawings. The present invention is not restricted to these embodiments.

Figure 1:
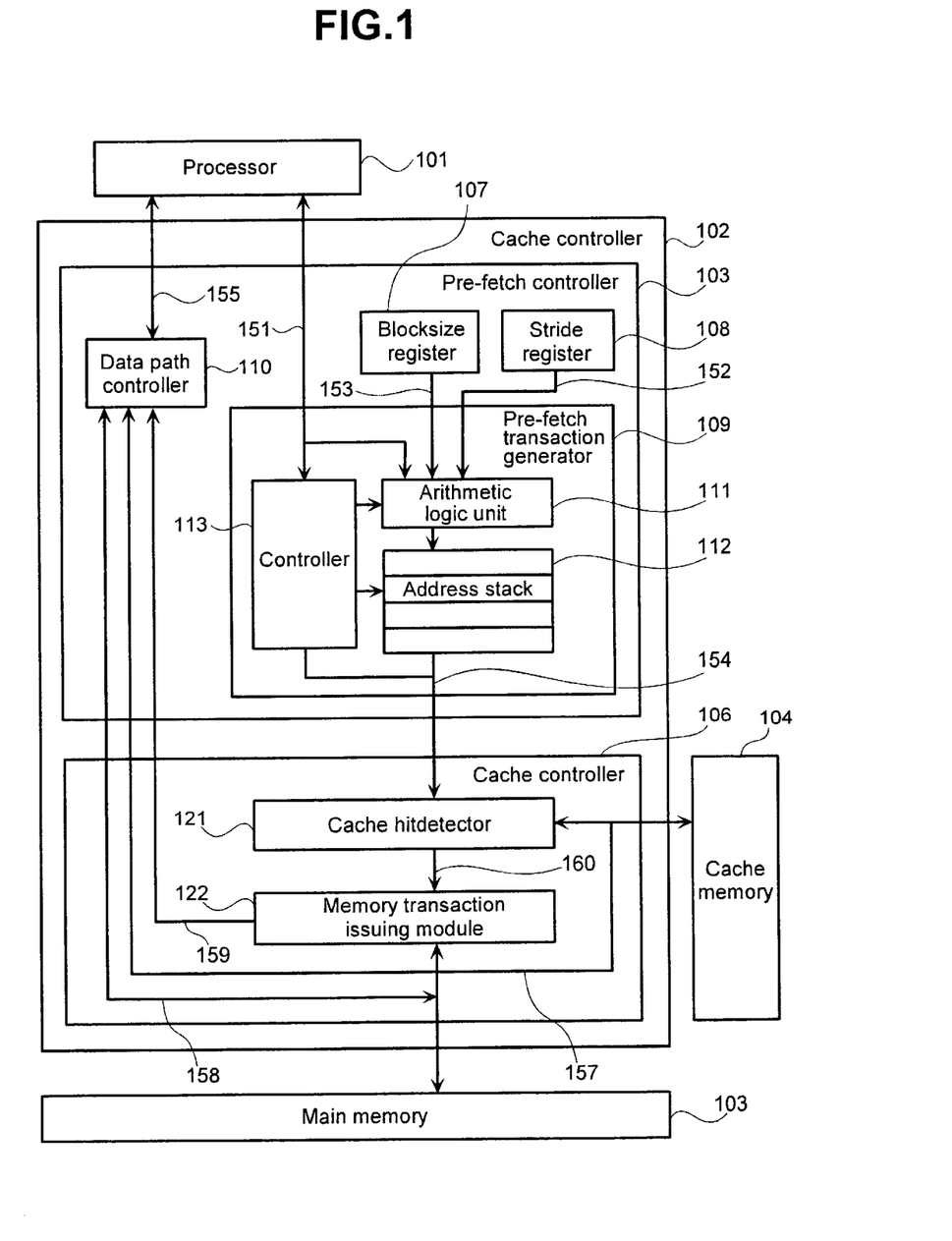
FIG. 1 is a block diagram showing an embodiment of cache controller according to the present invention and a computer system equipped therewith.

FIG. 1 is a block diagram showing an embodiment of a cache controller and a computer system equipped therewith. FIG. 1 shows a processor 101, a cache controller 102 according to the present invention, a main memory 103, and a cache memory 104. The cache controller 102 includes a pre-fetch controller 105 that generates pre-fetch requests and a cache controller 106 that serves as an interface between the main memory 103 and the cache memory 104. The pre-fetch controller 105 includes: a pre-fetch transaction generator (pre-fetch generator) 109 that receives from the processor 101 various read/write requests for the main memory 103 and generates pre-fetch requests; a block size register 107 and a stride register 108 that are set up beforehand with variables to be used when the pre-fetch transaction generator 109 generates pre-fetch addresses; and a data bus controller 110 controlling the output of data read from the cache memory 104 or the main memory 103 to the processor 101 via a path 155. As described later with reference to FIG. 2 and FIG. 3, the block size value in the block size register 107 affects the number of pre-fetches and the stride value in the stride register 108 affects the width of the pre-fetch stride.

The pre-fetch transaction generator 109 includes an arithmetic logic unit 111, an address stack 112, and a controller 113. The arithmetic logic unit 111, which is controlled by the controller 113, receives access request addresses from the processor 101 via the path 151, outputs this address directly, and also generates and outputs one or a plurality of pre-fetch addresses using the received access request address and the variables (block size value, stride value) received via the paths 152, 153 from the block size register 107 and the stride register 108. The address stack 112 stacks pre-fetch addresses generated by the arithmetic logic unit 111 and access request addresses output from the arithmetic logic unit 111. The controller 113 checks the various types of main memory access requests received via the path 151 from the processor 101 and determines the requests that require pre-fetch operations. The controller 113 also controls the address stack 112 so that it outputs main memory access requests and pre-fetch requests to the cache controller 106 via the path 154. Of the main memory access requests received from the processor 101, requests that are targeted for generation of pre-fetch requests will be referred to as target requests and the corresponding addresses will be referred to as target addresses. In this embodiment, data read requests will be used as target requests.

The cache controller 106 includes: a cache hit detector 121 that determines whether or not the cache memory 104 has already cached the data corresponding to pre-fetch requests and main memory access requests received from the pre-fetch controller 105 via the path 105; and a memory transaction issuing module 122 that receives, via the path 160, the results from the cache hit detector 121 and the address of data write requests or pre-fetch requests and data read requests, and that generates and issues data read requests and write requests to the main memory 103 via the path 158. The logical algorithms used for cache hit detection and cache hit address registration are widely known in the field so the corresponding descriptions will be omitted.

Figure 5:
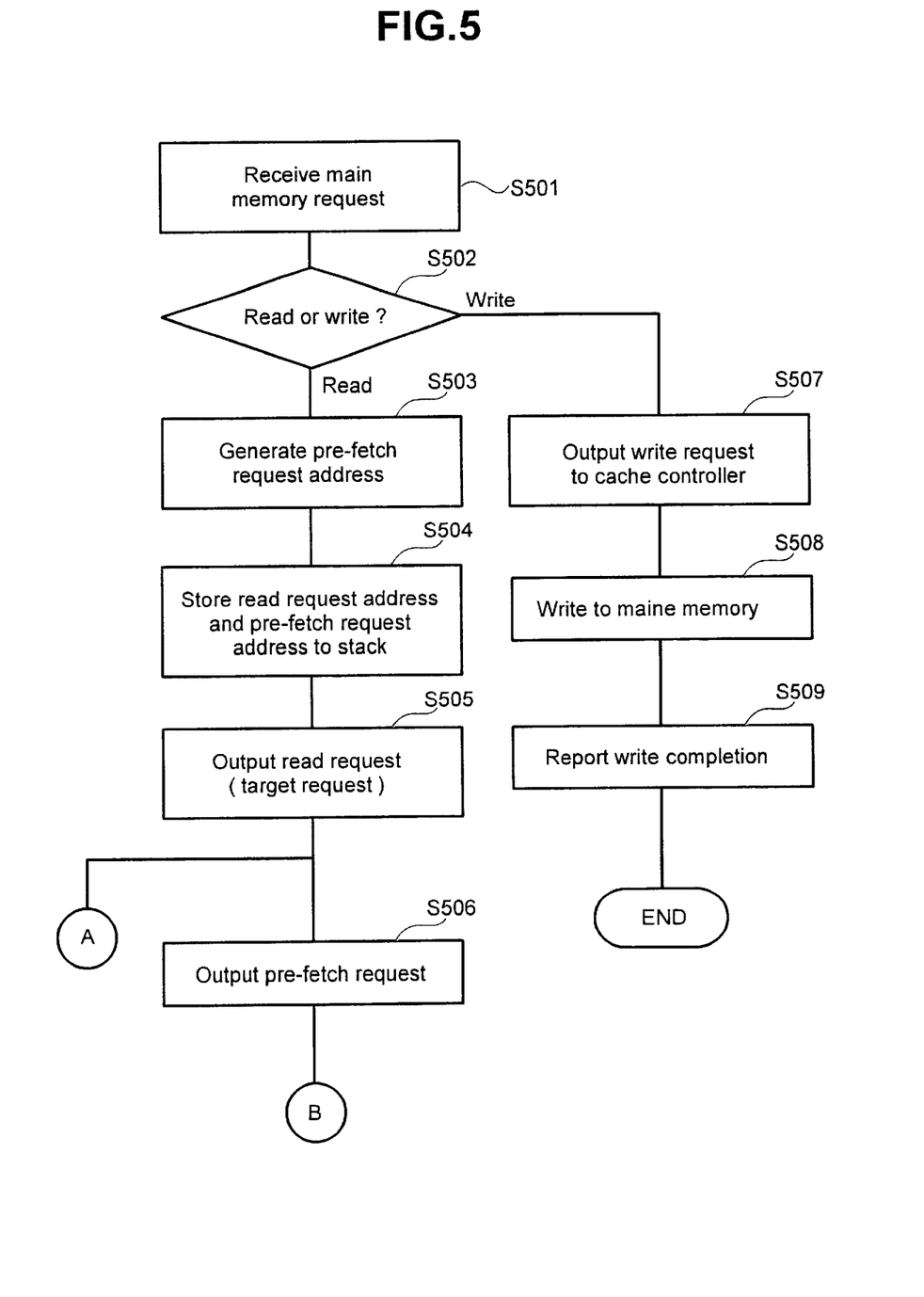
FIG. 5 is a drawing showing the operations performed by the cache controller from FIG. 1.
Figure 6:
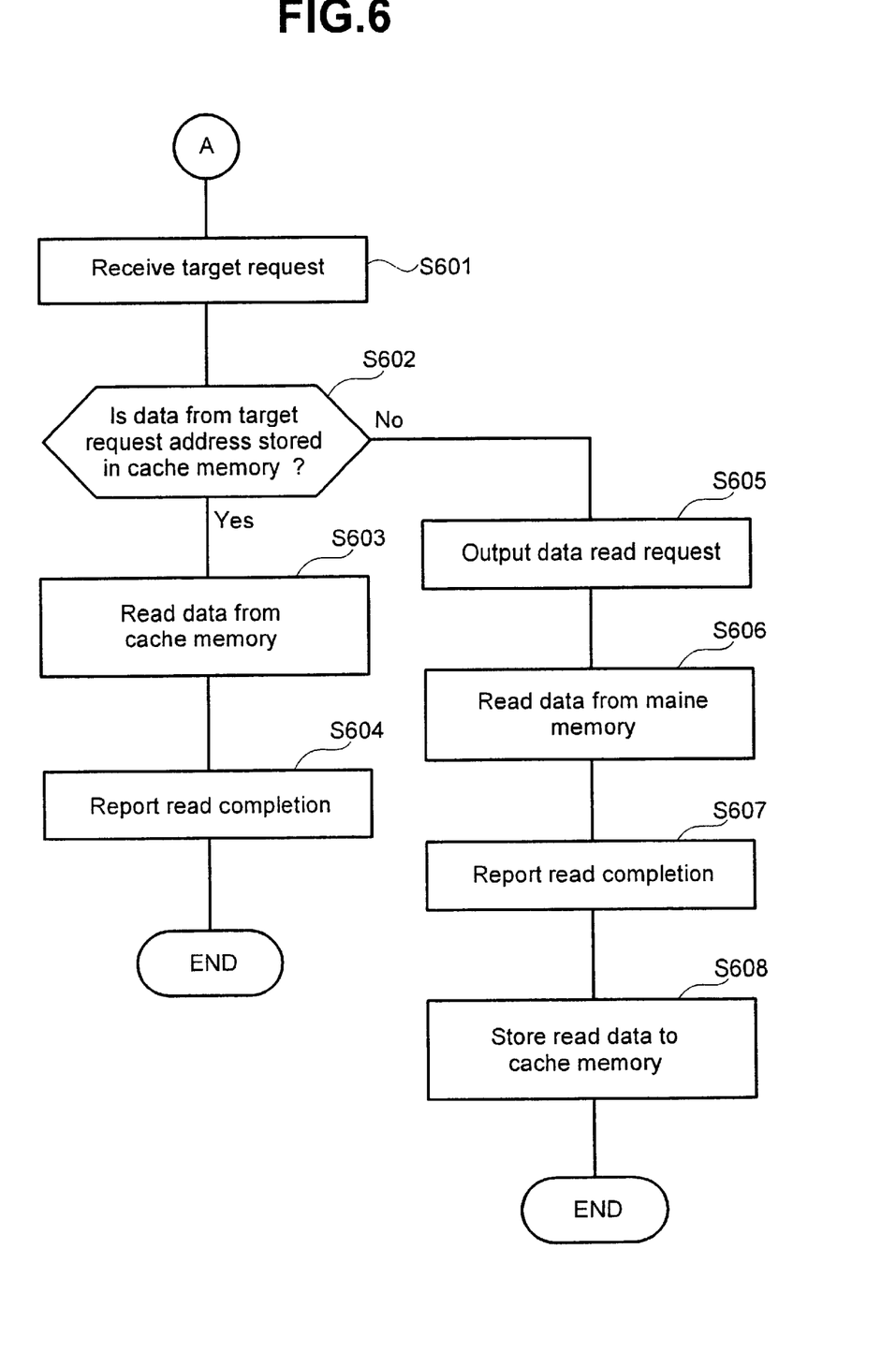
FIG. 6 and FIG. 7 are drawings showing the operations performed by the cache controller from FIG. 1.
Figure 7:
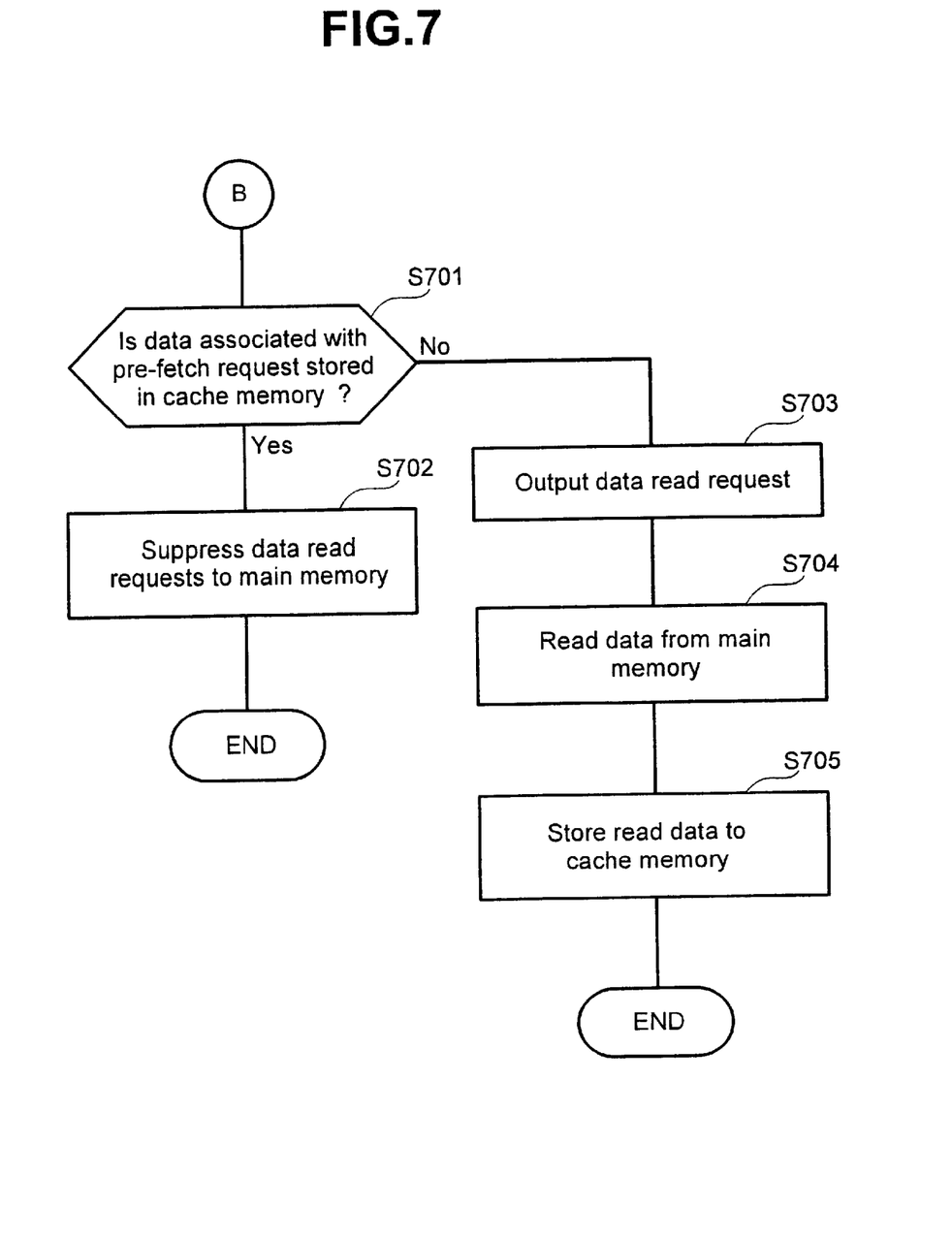

The following is a description, with references to FIG. 5 through FIG. 7, of the operations performed by the cache controller 102. The processor 101 issues data read/write requests for the main memory 103 to the cache controller 102 via the path 151. When the controller 113 of the pre-fetch transaction generator 109 receives the request for the main memory 103 issued by the processor 101 (S501), the request is checked to see if it is a read request or a write request (S502). If the controller 113 indicates that the request is a read request (target request), the arithmetic logic unit 111 of the pre-fetch transaction generator 109 generates one or a plurality of pre-fetch request addresses based on the values set up in the block size register 107 and the stride register 108 (S503), and stores these along with the read request address in the address stack 112 (S504). Then, the controller 113 of the pre-fetch transaction generator 109 controls the address stack 112 so that it first outputs, via the path 154, the data read request (target request) issued by the processor 101 (S505), and then outputs one or a plurality of pre-fetch instructions in sequence to the cache controller 106 (S506). (FIG. 5)

The cache hit detector 121 of the cache controller 106 receives the target request from the pre-fetch transaction generator 109 (S601), and uses the target request address to determine if the data corresponding to the address has already been stored in the cache memory 104 (S602). If the data corresponding to the target request is already stored in the cache memory 104, the cache hit detector 121 reads the data from the cache memory 104 (S603), and the data is output to the data bus controller 110 via the path 157. At the same time, a notification indicating the data has been read from the cache memory 104 is sent to the memory transaction issuing module 122 via the path 160. The memory transaction issuing module 122 notifies the data bus controller 110 via the path 159 that the data read has been completed. If the data corresponding to the target request had not been stored in the cache memory 104, the cache hit detector 121 outputs a request to the memory transaction issuing module 122 via the path 160 to read data from the main memory 103 (S605). The memory transaction issuing module 122 reads data from the main memory 103 (S606), outputs the data to the data bus controller 110 via the path 158, or notifies, via the path 159, the data bus controller 110 that the data read has been completed (S607). The memory transaction issuing module 122 stores the data read from the main memory 103 in the cache memory 104 via the cache hit detector 121 (S608). (See FIG. 6).

Next, the one or plurality of pre-fetch requests are processed by the cache controller 106 as follows. An evaluation is made to determine if the data corresponding to the pre-fetch request has already been stored in the cache memory 104 (S701). If it has, the cache hit detector 121 controls the memory transaction issuing module 122 so that the data read request to main memory 103 is suppressed (S702). If the data corresponding to the pre-fetch request is not stored in the cache memory 104, the cache hit detector 121 issues, via the path 160, a request to read data from the main memory 103 to the memory transaction issuing module 122 (S703). The memory transaction issuing module 122 reads the data from the main memory 103 (S704) and stores this data read from the main memory 103 in the cache memory 104 via the cache hit detector 121 (S705). (FIG. 7).

In FIG. 5, if the request for the main memory 103 issued by the processor is a write request, the pre-fetch transaction generator 109 outputs a write request for the main memory 103 to the cache controller 106 via the path 154 (S507). The data bus controller 110 takes the write data received from the processor 101 via the path 155 and sends it to the path 158. The cache hit detector 121 of the cache controller 106 receives the write request from the pre-fetch transaction generator 109 and passes it on to the memory transaction issuing module 122 via the path 160. The memory transaction issuing module 122 writes the write data output to the path 158 by the data bus controller 110 to the main memory 103 (S508), and notifies the data bus controller 110 via the path 158 that the data write has been completed (S509).

It would be possible to have write requests be target requests as well for cases such as when the processor 101 issues a read request after a write request. In this case, the operations performed for generating pre-fetch requests in the pre-fetch transaction generator 109 and the pre-fetch data read/write operations in the cache controller 106 would be basically similar to the operations performed for the read requests described above.

Figure 2:
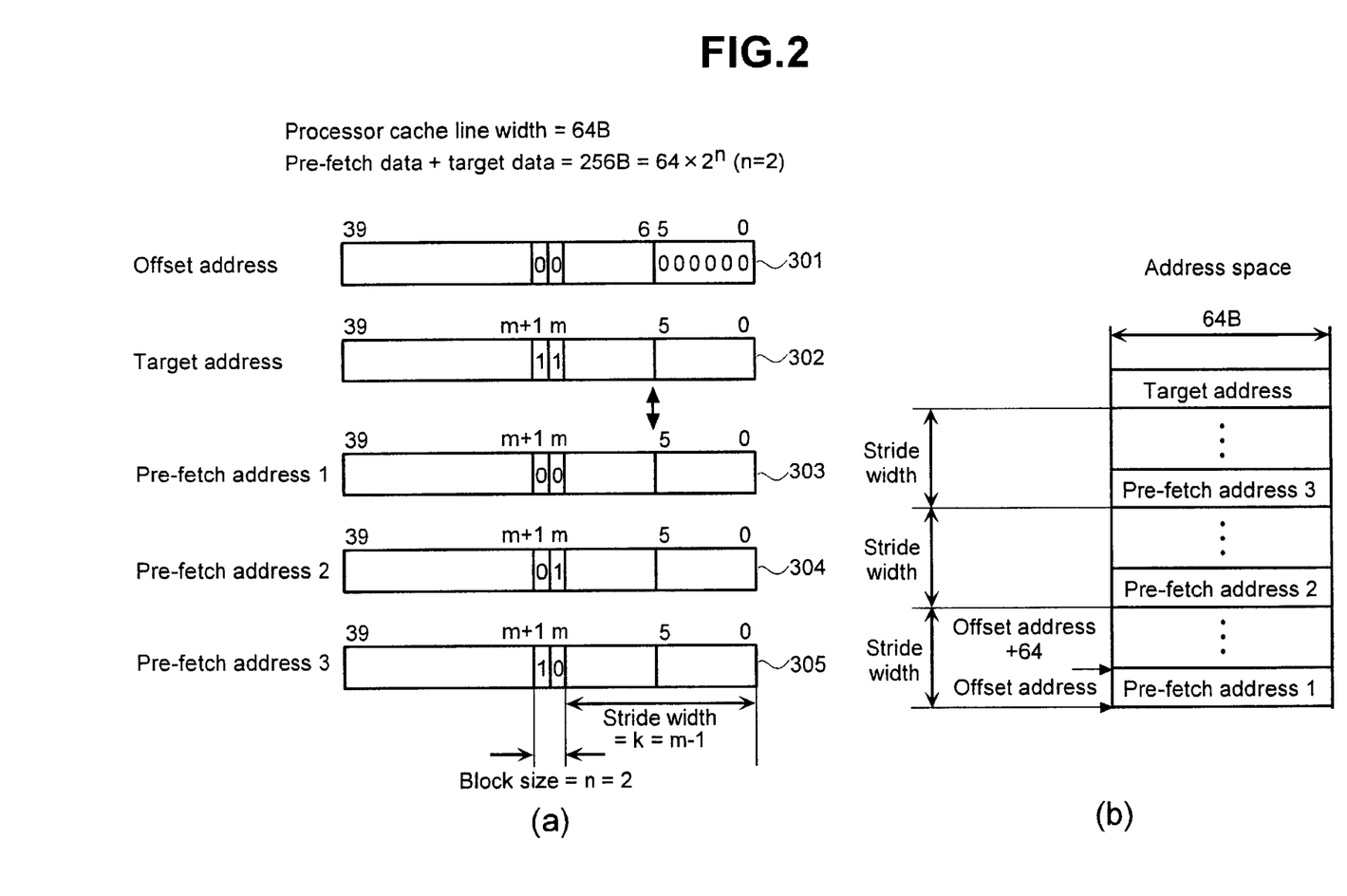
FIG. 2 is a drawing showing a specific example of how a pre-fetch address is generated.
Figure 3:
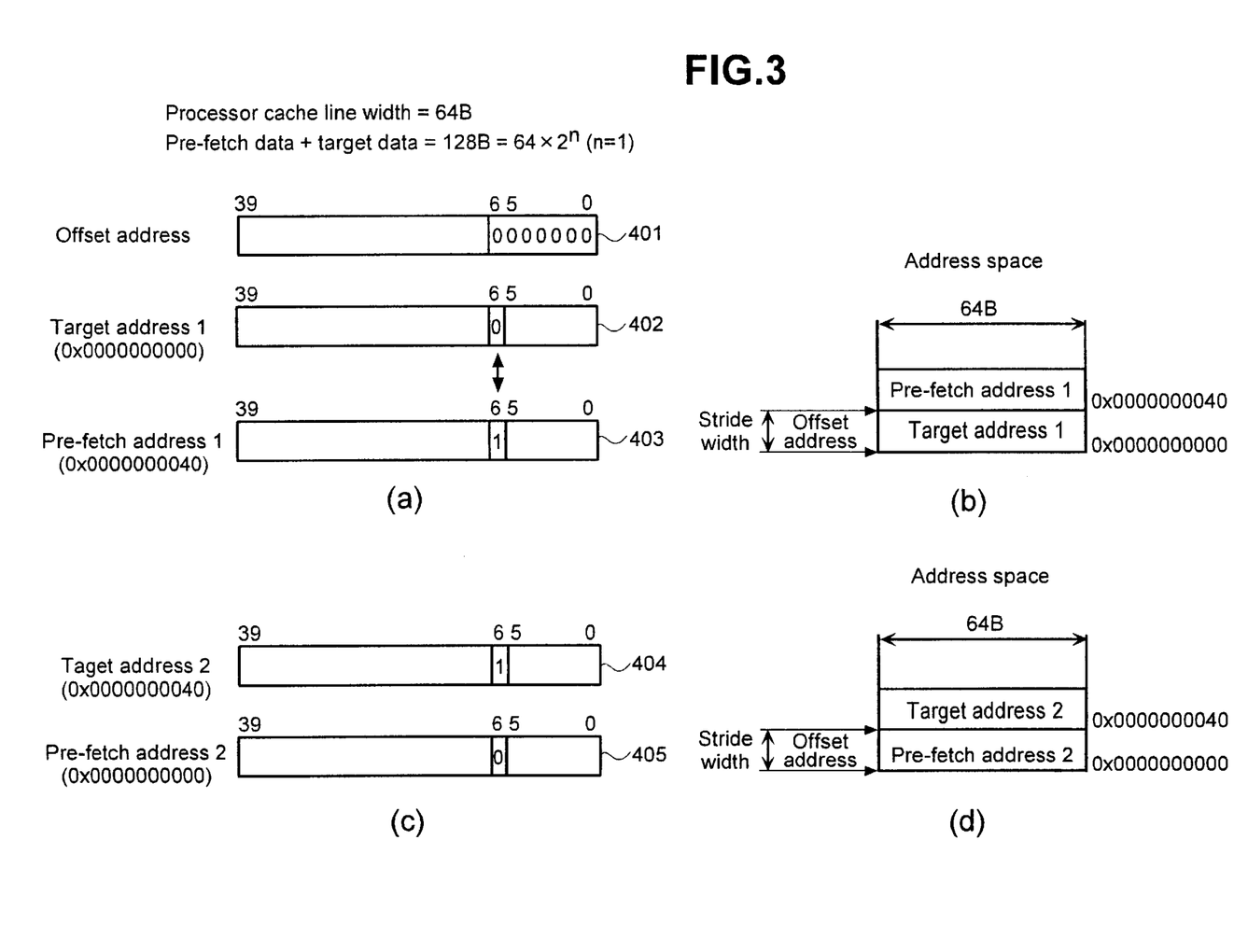
FIG. 3 is a drawing showing a specific example of how another pre-fetch address is generated.

The following, with references to FIG. 2 and FIG. 3, is a description of specific examples of pre-fetch addresses generated by the arithmetic logic unit 111 in the pre-fetch transaction generator 109 from FIG. 1.

FIG. 2(a) shows an offset address 301, a target address 302, and generated pre-fetch addresses 303–305. In this case, the processor cache size is 64 bytes, the block size register 107 is set up for block size n=2, and the stride register 108 is set up for stride width k=m−1. FIG. 2(b) shows the relationship between the target address and the pre-fetch addresses 1–3 in the address space. The arithmetic logic unit 111 of the pre-fetch transaction generator 109 uses the address of the target request received from the processor 101 to calculate the offset address 301, uses the value n in the block size register 107 to calculate the pre-fetch request count (three, in this example) needed to pre-fetch processor cache line size multiplied by (2n−1); and uses the value k of the stride register 108 to calculate the stride width from the offset address 301. Based on the results of these calculations, the arithmetic logic unit 111 of the pre-fetch transaction generator 109 generates multiple pre-fetch request addresses (in this example, pre-fetch addresses 1–3), and stores these in the address stack 112 along with the target address. The stride width of the pre-fetch address can, for example, be determined by running a program and examining the hit rate. Subsequently, the hit rate can be increased for similar programs by setting up slide register 108 with the determined slide value. FIG. 3(a), (c) show an offset address 401, a target address 1 (0x0000000000) 402, a pre-fetch address 1 (0x0000000040) 403, a target address 2 (0x0000000040) 404, and a pre-fetch address 2 (0x0000000000) 405. In this case, the processor cache size is 64 bytes, the block size register 107 is pre-set to n=1, and the stride register 108 is pre-set to k=5. FIG. 3(b), (d) show the address space relationships between the target address 1 and the pre-fetch address 1, and between the target address 2 and the pre-fetch address. When the arithmetic logic unit 111 of the pre-fetch transaction generator 109 receives the target address 1 shown in FIG. 3(a), it calculates an offset address of 0x0000000000. At the same time, using the value (n=1) in the block size register 107, it calculates the pre-fetch request count (2n−1).

In this example, the processor cache size×21=128 bytes. Thus, in addition to the 64 bytes of target request data, an address for another 64 bytes of pre-fetch request data is generated. The generated pre-fetch request address is calculated from the value (k=5) in the stride register 108, as shown in FIG. 3(b). If the target address 2 shown in FIG. 3(c) is received, 128 bytes of data would be read from the main memory 103 by a pre-fetch request of the target request, just as when the target address 1 is received as shown in FIG. 3(d). As FIG. 3 shows, the present invention can pre-fetch data that is higher or lower than the target request.

What is claimed is:

1. In a computer system equipped with a cache memory between a processor and a main memory, a cache control method comprising the steps of:

generating a pre-fetch request for said main memory based on a data read request address when a data read request for main memory is issued; and outputting said data read request and said pre-fetch request, wherein said pre-fetch request address is generated using a predetermined block size and stride size, calculating an offset address using said data read request address, calculating a pre-fetch request count using said block size, and calculating a stride width from said offset address using said stride.

2. A cache control method according to claim 1 further comprising the steps of:

using said read request address to determine whether data corresponding to said address is stored in said cache memory;

reading said data from said cache memory when said data corresponding to said address is stored in said cache memory;

outputting said read data; and reporting completion of the reading of said data.

3. A cache control method according in claim 1 further comprising the steps of:

reading data corresponding to said request from said main memory when said data corresponding to said address is not stored in said cache memory;

outputting said read data; and reporting completion of the reading of said data.

4. A cache control method according to claim 1 further comprising the step of storing said read data in said cache memory after said data corresponding to said request is read.

5. A cache control method according to claim 1 further comprising the steps of:

determining whether data corresponding to said pre-fetch request is stored in said cache memory; and suppressing said data read request for said main memory when said determining step determines that said data is stored.

6. A cache control method according to claim 5 further comprising the steps of:
   reading said data from said main memory when said determining step determines that said data is not stored in said cache memory; and
   storing said read data in said cache memory.

7. A cache control method according to claim 1 further comprising the step of generating a pre-fetch request for an address either above or below said read request address.

8. A cache control method according to claim 1 further comprising the step of first outputting said data read request and then outputting said pre-fetch request when said pre-fetch request is generated.

9. A cache control method according to claim 1 wherein a pre-fetch request is generated for an address that is either higher or lower than said read request address.

10. In a computer system equipped with a cache memory between a processor and a main memory, a cache controller comprising:
   storing means for storing variables including a pre-fetch block size and stride value;
   generating means for generating access requests for said main memory and at least one pre-fetch request by calculating an offset address using a request from the processor, a pre-fetch request count using said block size, and a stride width from said offset address using said stride; and
   means for reading data from said main memory in response to said generated pre-fetch requests and writing said data to said cache memory.

11. A cache controller according to claim 10 wherein said generating means generates pre-fetch requests for an address either higher or lower than an address of said main memory access request.

12. In a computer system equipped with a cache memory between a processor and a main memory, a cache controller comprising:
   registers storing variables, including a pre-fetch block size and stride value;
   a pre-fetch generator generating an access request for said main memory and a pre-fetch request by calculating an offset address with a request from the processor, a pre-fetch request count with said block size, and a stride width from said offset address with said stride value; and
   a cache controller reading data from said main memory in response to said generated pre-fetch requests and writing said data to said cache memory.

13. A cache controller according to claim 12 wherein said pre-fetch controller identifies whether said access request is a data read request or write request, generates a pre-fetch request address using said variables when said request is a read request, outputs said data read request to said cache controller, and outputs said pre-fetch request to said cache controller.

14. A cache controller according to claim 13 wherein said cache controller determines whether data corresponding to said pre-fetch request output from said pre-fetch controller is stored in said cache memory, suppresses said request to read data from said main memory when said data is stored in said cache memory, and, when said data is not stored in cache memory, reads said data corresponding to said read request from said main memory and stores said data in said cache memory.

15. In a computer system equipped with a cache memory between a processor and a main memory, a cache control method comprising the steps of:
   identifying whether a main memory request is a data read request or a data write request;
   generating a pre-fetch request address based on values set up in a block size register and a stride register when said request is a data read request;
   storing said pre-fetch request address and said data read request address;
   outputting said data read request; and
   outputting said pre-fetch request, wherein
      said pre-fetch request address is generated using the values set up in said block size register and said stride register,
      calculating an offset address using said data read request address,
      calculating a pre-fetch request count using the value set up in said block size register, and
      calculating a stride width from said offset address using the value set up in said stride size register.

16. A cache control method according to claim 15 wherein, when said main memory request is a data write request, said data is written to said main memory and completion of the writing of said data is reported.

17. A cache control method according to claim 15 further comprising the step of generating a pre-fetch request for an address either higher or lower than an address of said data read request.

* * * * *